US012591991B2

(12) United States Patent
Kim et al.

(10) Patent No.: US 12,591,991 B2
(45) Date of Patent: Mar. 31, 2026

(54) APPARATUS, SYSTEM, AND CONTROL METHOD FOR MEASURING LED PANEL

(71) Applicant: SAMSUNG ELECTRONICS CO., LTD., Suwon-si (KR)

(72) Inventors: Kwangdon Kim, Suwon-si (KR); Seihan Park, Suwon-si (KR); Jaehee Kwak, Suwon-si (KR); Chanyul Kim, Suwon-si (KR); Dubok Park, Suwon-si (KR); Cheolseong Park, Suwon-si (KR); Sangwook Baek, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 388 days.

(21) Appl. No.: 18/143,389

(22) Filed: May 4, 2023

(65) Prior Publication Data

US 2023/0274456 A1 Aug. 31, 2023

Related U.S. Application Data

(63) Continuation of application No. PCT/KR2021/012031, filed on Sep. 6, 2021.

(30) Foreign Application Priority Data

Nov. 6, 2020 (KR) ........................ 10-2020-0147761

(51) Int. Cl.
*G06T 7/60* (2017.01)
*G01J 1/42* (2006.01)
(Continued)

(52) U.S. Cl.
CPC ................. *G06T 7/60* (2013.01); *G01J 1/42* (2013.01); *G01J 3/465* (2013.01); *G06T 7/90* (2017.01);
(Continued)

(58) Field of Classification Search
CPC ... G06T 7/60; G06T 7/90; G06T 2207/10024; G06T 2207/20081; G06T 2207/20084;
(Continued)

(56) References Cited

U.S. PATENT DOCUMENTS 5,168,352 A * 12/1992 Naka ..................... G06T 11/001
348/34
7,365,722 B2 * 4/2008 Lee ...................... G09G 3/3607
345/88

(Continued)

FOREIGN PATENT DOCUMENTS

CN 102723054 A 10/2012
CN 110660060 B 5/2020
(Continued)

OTHER PUBLICATIONS

Kim K, Lim T, Kim C, Park S, Park C, Keum C. High-precision color uniformity based on 4D transformation for micro-LED. InLight-Emitting Devices, Materials, and Applications XXIV Feb. 25, 2020 (vol. 11302, pp. 197-203). SPIE.*
(Continued)

*Primary Examiner* — Xuemei G Chen
(74) *Attorney, Agent, or Firm* — Sughrue Mion, PLLC

(57) ABSTRACT

Disclosed are an apparatus, a system, and a control method for measuring an LED panel. The method for measuring an LED panel comprises the steps of: capturing an image of an LED panel displayed in a preset color; classifying each pixel of the LED panel from the captured image of the LED panel into pixel regions having different sizes according to a predetermined threshold brightness value; obtaining a tristimulus value of each pixel by using the data of the classified pixel regions and a trained artificial intelligence model; and obtaining the luminance and chrominance of each pixel on the basis of the obtained tristimulus value.

19 Claims, 13 Drawing Sheets

(51) Int. Cl.
*G01J 3/46* (2006.01)
*G06T 7/90* (2017.01)
(52) U.S. Cl.
CPC ................. *G01J 2001/4252* (2013.01); *G06T 2207/10024* (2013.01); *G06T 2207/20081* (2013.01); *G06T 2207/20084* (2013.01)
(58) Field of Classification Search
CPC ...... G01J 1/42; G01J 3/465; G01J 2001/4252; G09G 3/006; G09G 3/2003; G09G 2320/0693; G09G 2340/06; G09G 3/32; G06N 3/08; G06N 3/04
See application file for complete search history.

(56) References Cited

U.S. PATENT DOCUMENTS

| | | | |
|---|---|---|---|
| 7,404,645 B2 | 7/2008 | Margulis | |
| 7,705,810 B2* | 4/2010 | Choi | G09G 3/3225 |
| | | | 315/169.3 |
| 8,531,381 B2 | 9/2013 | Feng | |
| 8,988,682 B2 | 3/2015 | Yin et al. | |
| 10,360,847 B2 | 7/2019 | Lee et al. | |
| 10,657,868 B2 | 5/2020 | Biwa et al. | |
| 2003/0076424 A1 | 4/2003 | Minakuti et al. | |
| 2004/0239698 A1* | 12/2004 | Kamada | G09G 3/3607 |
| | | | 715/714 |
| 2006/0023272 A1* | 2/2006 | Tezuka | H04N 1/6033 |
| | | | 358/1.9 |
| 2007/0035706 A1 | 2/2007 | Margulis | |
| 2013/0147860 A1* | 6/2013 | Ishida | G09G 5/10 |
| | | | 345/690 |
| 2013/0342557 A1* | 12/2013 | Finlayson | H04N 1/60 |
| | | | 358/1.9 |
| 2015/0015470 A1* | 1/2015 | Jiko | G09G 3/001 |
| | | | 345/88 |
| 2015/0110191 A1* | 4/2015 | Yang | H04N 19/105 |
| | | | 375/240.16 |
| 2016/0011121 A1* | 1/2016 | Tomioka | G01N 21/8851 |
| | | | 348/128 |
| 2016/0035069 A1* | 2/2016 | Min | G06T 5/20 |
| | | | 382/266 |
| 2016/0234490 A1 | 8/2016 | Sasada et al. | |
| 2017/0011692 A1 | 1/2017 | Lee et al. | |
| 2017/0103694 A1* | 4/2017 | Kim | G09G 3/006 |
| 2017/0116961 A1* | 4/2017 | Jun | G09G 5/10 |
| 2017/0140733 A1* | 5/2017 | Park | G09G 5/10 |

| | | | |
|---|---|---|---|
| 2018/0233107 A1* | 8/2018 | Wu | G09G 3/3607 |
| 2020/0035195 A1 | 1/2020 | Maeng et al. | |
| 2020/0098835 A1* | 3/2020 | Bae | G09G 3/2074 |
| 2020/0184905 A1* | 6/2020 | Park | G09G 3/342 |
| 2021/0142711 A1* | 5/2021 | Maeng | G06N 3/08 |
| 2021/0215536 A1* | 7/2021 | Schuck, III | G02B 27/01 |
| 2021/0318232 A1* | 10/2021 | Kim | G01J 3/506 |
| 2021/0335323 A1* | 10/2021 | Kajita | G09G 5/10 |
| 2021/0358457 A1* | 11/2021 | Maeng | G06T 7/0002 |
| 2022/0415024 A1* | 12/2022 | Toyoda | G06V 10/82 |

FOREIGN PATENT DOCUMENTS

| | | |
|---|---|---|
| CN | 110070524 B | 5/2021 |
| JP | 6-295168 A | 10/1994 |
| JP | 3614126 B2 | 1/2005 |
| JP | 2007-33391 A | 2/2007 |
| JP | 5173027 B2 | 3/2013 |
| JP | 6368669 B2 | 8/2018 |
| JP | 201970648 A | 5/2019 |
| JP | 7106287 B2 | 7/2022 |
| KR | 10-2008-0075843 A | 8/2008 |
| KR | 10-2014-0054719 A | 5/2014 |
| KR | 10-2017-0006969 A | 1/2017 |
| KR | 10-2018-0012362 A | 2/2018 |
| KR | 10-2018-0061792 A | 6/2018 |
| KR | 10-2019-0102152 A | 9/2019 |
| KR | 10-2088125 B1 | 3/2020 |
| WO | 2020/023675 A1 | 1/2020 |

OTHER PUBLICATIONS

Communication dated Sep. 19, 2024, issued by the Korean Intellectual Property Office in Korean Patent Application No. 10-2020-0147761.

European Extended Search Report issued Nov. 15, 2023 issued by the European Patent Office for EP Patent Application No. 21889358.4.

International Search Report (PCT/ISA/210) issued by the International Searching Authority on Dec. 15, 2021 in corresponding International Application No. PCT/KR2021/012031.

Written Opinion (PCT/ISA/237) issued by the International Searching Authority on Dec. 15, 2021 in corresponding International Application No. PCT/KR2021/012031.

ProMetric I Imaging Colorimeter, Radian Vision System, 2020.

Communication dated Aug. 5, 2025, issued by the European Patent Office in counterpart European Application No. 21889358.4.

\* cited by examiner

FIG. 4A

| 0 | 0 | 0 | 3 | 2 | 0 |
|---|-----|-----|-----|-----|---|
| 1 | 255 | 255 | 255 | 129 | 1 |
| 2 | 193 | 255 | 255 | 200 | 2 |
| 0 | 200 | 173 | 192 | 180 | 0 |
| 2 | 96 | 48 | 74 | 91 | 2 |

Sensor data

FIG. 4B

| 0 | 0 | 0 | 3 | 2 | 0 |
|---|---|---|---|---|---|
| 1 | 255 | 255 | 255 | 129 | 1 |
| 2 | 193 | 255 | 255 | 200 | 2 |
| 0 | 200 | 173 | 192 | 180 | 0 |
| 2 | 96 | 48 | 74 | 91 | 2 |

Fixed pixel area

FIG. 4C

| 0 | 0 | 0 | 3 | 2 | 0 |
|---|-----|-----|-----|-----|---|
| 1 | 255 | 255 | 255 | 129 | 1 |
| 2 | 193 | 255 | 255 | 200 | 2 |
| 0 | 200 | 173 | 192 | 180 | 0 |
| 2 | 96 | 48 | 74 | 91 | 2 |

Dynamic pixel area 3-channel RGB data                    3-channel &
                                      2D XYZ data 3-channel RGB data 3-channel &
2D XYZ data

FIG. 6A

| 121 | 132 | 104 | 104 | X : 189 |
|-----|-----|-----|-----|---------|
| 189 | 107 | 110 | 112 | Y : —— |
| 116 | 128 | 135 | 129 | Z : —— |

FIG. 6B

| 121 | 132 | 104 | 104 | X : 123.9 |
| 189 | 107 | 110 | 112 | Y : —— |
| 116 | 128 | 135 | 129 | Z : —— |

PAIR OF INPUT DATA AND OUTPUT DATA

FIG. 9

| ITEM | CONVENTIONAL TECHNOLOGY | MEASURING METHOD OF THE DISCLOSURE |
|---|---|---|
| MEASURING TIME | 15 MINUTES | 3 MINUTES |
| MEASUREMENT DEVIATION | ± 1.93% | ± 1.69% |

APPARATUS, SYSTEM, AND CONTROL METHOD FOR MEASURING LED PANEL

CROSS-REFERENCE TO RELATED APPLICATIONS

This application is a by-pass continuation of International Application No. PCT/KR2021/012031, filed on Sep. 6, 2021, which is based on and claims priority to Korean Patent Application No. 10-2020-0147761, filed on Nov. 6, 2020, in the Korean Intellectual Property Office, the disclosures of which are incorporated by reference herein in their entireties.

BACKGROUND

1. Field

The disclosure relates to an apparatus, a system, and a control method for measuring an LED panel, and more particularly, to an LED panel measuring apparatus that measures characteristics of pixels by capturing an LED panel by a camera, and a system and a control method for the same.

2. Description of Related Art

In an LED panel of a display apparatus, numerous LED elements are included. The LED elements generate lights of different wavelengths and different strengths from one another according to processes. If LED elements included in an LED panel generate lights of different wavelengths and different strengths from one another, a problem wherein the LED panel emits lights non-uniformly may occur. Accordingly, a process of correcting the light emission uniformity of the LED elements included in the LED panel is necessary.

For correcting the light emission uniformity of LED elements included in an LED panel, it is important to measure the luminance and the chromaticity of each element correctly. The luminance and the chromaticity of an LED element are generally measured by using an image colorimeter. An image colorimeter includes a CCD sensor and a tricolor filter specialized for measuring. The luminance and the chromaticity of an LED element can be measured correctly by using an image colorimeter.

However, measurement using an image colorimeter needs a calibration process every time measurement is made, and thus there is a problem that a long time is spent for measurement. Also, measurement using an image colorimeter has a problem that data should be obtained for each color filter in a calibration process and a measurement process. In addition, an image colorimeter includes a CCD sensor, and thus there is a problem that the cost of the equipment is expensive. Accordingly, there is a need for a technology for measuring the luminance and the chromaticity of an LED element with reduced time for measurement and relatively cheap equipment.

SUMMARY

Provided is an LED panel measuring apparatus that reduces the complexity of a measuring process, and the measuring time and cost while maintaining the measurement accuracy of the pixels of an LED panel, and a system and a control method for the same.

According to an aspect of the disclosure, a method for measuring an light-emitting diode (LED) panel includes:

capturing an image of the LED panel while the LED panel displays a preset color; classifying, based on the captured image of the LED panel, each pixel of the LED panel into pixel regions comprising different sizes, wherein the size of each pixel region corresponds to a predetermined threshold brightness value; obtaining a tristimulus value of each pixel of the LED panel based on the classified pixel regions and a trained artificial intelligence model; and obtaining a luminance and a chromaticity of each pixel of the LED panel based on the obtained tristimulus value.

A positive correlation may exist between the sizes of the pixel regions and brightness values of the pixels included in the pixel regions.

The trained artificial intelligence model may be trained using input data for one pixel including data of a pixel region in a red (R) color of a preset size, data of a pixel region in a green (G) color of the preset size, and data of a pixel region in a blue (B) color of the preset size, and output data for the one pixel including two-dimensional (2D) data of a tristimulus value of the same size as the preset size.

The output data may be padded based on the tristimulus value.

The obtaining the tristimulus value of each pixel may further include: inputting data of a pixel region in an R color, data of a pixel region in a G color, and data of a pixel region in a B color of each pixel of the LED panel into the trained artificial intelligence model, and obtaining two-dimensional (2D) data for a tristimulus value of each pixel of a size corresponding to a size of the pixel region of the R color, a size of the pixel region of the G color, and a size of the pixel region of the B color from the trained artificial intelligence model.

The obtaining the tristimulus value of each pixel may further include: obtaining a single value as the tristimulus value of each pixel comprising one of a maximum value, an average value, or a weighted average value of the 2D data for the tristimulus value of each pixel.

According to an aspect of the disclosure, an LED panel measuring apparatus includes: an input interface; a display; at least one memory storing a trained artificial intelligence model; and at least one processor configured to: control the input interface to receive an image of an LED panel displaying a preset color, classify, based on the received image of the LED panel, each pixel of the LED panel into pixel regions comprising different, wherein the size of each pixel region corresponds to a predetermined threshold brightness value, obtain a tristimulus value of each pixel of the LED panel based on the data of the classified pixel regions and the trained artificial intelligence model, and obtain a luminance and a chromaticity of each pixel of the LED panel based on the obtained tristimulus value, and display the obtained luminance and the obtained chromaticity of each pixel on the display.

A positive correlation may exist between the sizes of the pixel regions and brightness values of the pixels included in the pixel regions.

The trained artificial intelligence model may be trained using data for one pixel including data of a pixel region in a red (R) color of a preset size, data of a pixel region in a green (G) color of the preset size, and data of a pixel region in a blue (B) color of the preset size for one pixel are set as input data, and output data for the one pixel including two-dimensional (2D) data of a tristimulus value of the same size as the preset size.

The output data may be padded based on the tristimulus value.

The at least one processor of the LED panel measuring apparatus may be further configured to: input data of a pixel region in an R color, data of a pixel region in a G color, and data of a pixel region in a B color of each pixel of the LED panel into the trained artificial intelligence model, and obtain two-dimensional (2D) data for a tristimulus value of each pixel of the LED panel of a size corresponding to a size of the pixel region of the R color, a size of the pixel region of the G color, and a size of the pixel region of the B color from the trained artificial intelligence model.

The at least one processor of the LED panel measuring apparatus may be further configured to: obtain a single value as the tristimulus value of each pixel of the LED panel including one of a maximum value, an average value, or a weighted average value of the 2D data for the tristimulus value of each pixel of the LED panel.

According to an aspect of the disclosure, an LED panel measuring system includes: a camera configured to capture an image of an LED panel while the LED panel displays a preset color; and an LED panel measuring apparatus comprising: at least one memory storing at least one instruction; and at least one processor configured to execute the at least one instruction to: receive input of the captured image of the LED panel, classify, based on the captured image of the LED panel, each pixel of the LED panel into pixel regions having different sizes, wherein the size of each pixel region corresponds to a predetermined threshold brightness value, obtain a tristimulus value of each pixel of the LED panel based on the data of the classified pixel regions and a trained artificial intelligence model, obtain a luminance and a chromaticity of each pixel of the LED panel based on the obtained tristimulus value, and display, on a display, the obtained luminance and the obtained chromaticity of each pixel.

A positive correlation may exist between the sizes of the pixel regions and the brightness values of the pixels included in the pixel regions.

The trained artificial intelligence model may be trained using input data for one pixel including data of a pixel region in a red (R) color of a preset size, data of a pixel region in a green (G) color of the preset size, and data of a pixel region in a blue (B) color of the preset size, and output date for the one pixel including two-dimensional (2D) data of a tristimulus value of the same size as the preset size.

The output data may be padded based on the tristimulus value.

The at least one processor of the LED panel measuring system may be further configured to: input data of a pixel region in an R color, data of a pixel region in a G color, and data of a pixel region in a B color of each pixel of the LED panel into the trained artificial intelligence model, and obtain two-dimensional (2D) data for a tristimulus value of each pixel of the LED panel of a size corresponding to a size of the pixel region of the R color, a size of the pixel region of the G color, and a size of the pixel region of the B color from the trained artificial intelligence model.

The at least one processor of the LED panel measuring system may be further configured to: obtain a single value as the tristimulus value of each pixel of the LED panel comprising one of a maximum value, an average value, or a weighted average value of the 2D data for the tristimulus value of each pixel of the LED panel.

According to an aspect of the disclosure, a non-transitory computer readable medium having instructions stored therein, which when executed by a processor cause the processor to execute a method of measuring an LED panel, where the method includes: capturing an image of the LED panel while the LED panel displays a preset color; classifying, based on the captured image of the LED panel, each pixel of the LED panel into pixel regions comprising different sizes, wherein the size of each pixel region corresponds to a predetermined threshold brightness value; obtaining a tristimulus value of each pixel based on the classified pixel regions and a trained artificial intelligence model; and obtaining a luminance and a chromaticity of each pixel of the LED panel based on the obtained tristimulus value.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 4A is a diagram illustrating sensing data according to one or more embodiments of the disclosure;

FIG. 4B is a diagram illustrating fixed pixel data according to one or more embodiments of the disclosure;

FIG. 4C is a diagram illustrating dynamic pixel data according to one or more embodiments of the disclosure;

FIG. 6A is a diagram illustrating an embodiment of identifying a maximum value in 2D data of a tristimulus value as a tristimulus value of a pixel;

FIG. 6B is a diagram illustrating an embodiment of identifying an average value in 2D data of a tristimulus value as a tristimulus value of a pixel;

FIG. 9 is a diagram illustrating a measurement result according to one or more embodiments of the disclosure.

DETAILED DESCRIPTION

Figure 1:
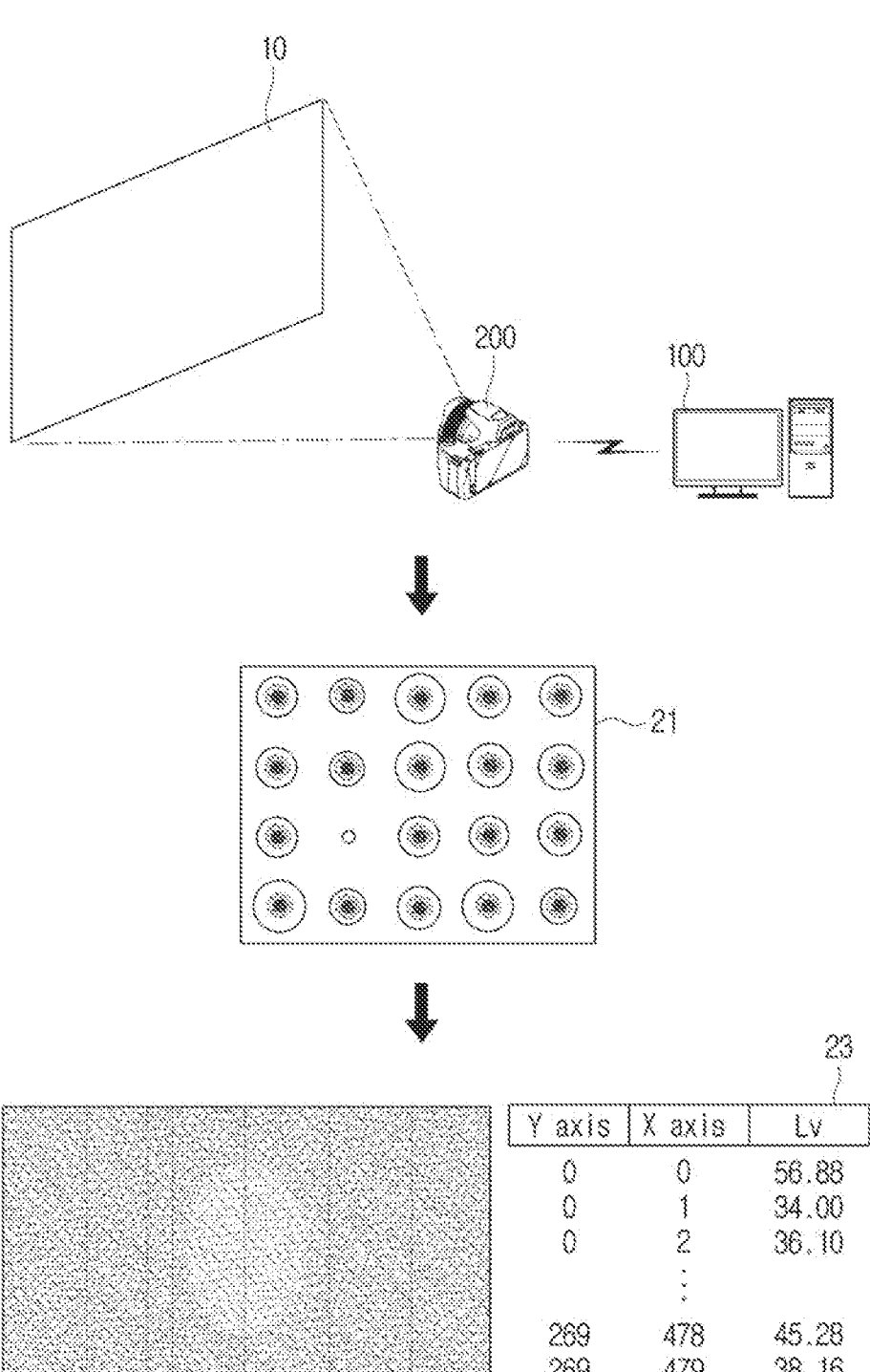
FIG. 1 is a diagram illustrating a process of measuring an LED panel according to one or more embodiments of the disclosure.

Hereinafter, various embodiments will be described in more detail with reference to the accompanying drawings. The embodiments described in this specification may be modified in various ways. Also, specific embodiments may be illustrated in the drawings, and described in detail in the detailed description. However, specific embodiments disclosed in the accompanying drawings are provided solely to aid in understanding the various embodiments disclosed herein. Accordingly, the technical idea of the disclosure is not restricted by the specific embodiments disclosed in the accompanying drawings, and the embodiments should be understood as including all equivalents or alternatives included in the idea and the technical scope of the disclosure.

Also, terms including ordinal numbers such as 'the first' and 'the second' may be used to describe various components, but these components are not limited by the aforementioned terms. The aforementioned terms are used only for the purpose of distinguishing one component from another component.

In addition, in this specification, terms such as "include" and "have" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof. Further, the description in the disclosure that an element is "coupled with/to" or "connected to" another element should be interpreted to mean that the one element may be directly coupled with/to or connected to the another element, but still another element may exist between the elements. In contrast, the description that one element is "directly coupled" or "directly connected" to another element can be interpreted to mean that still another element does not exist between the one element and the another element.

Meanwhile, "a module" or "a part" for the elements used in this specification performs at least one function or operation. Also, "a module" or "a part" may perform a function or an operation by hardware, software, or a combination of hardware and software. Also, a plurality of "modules" or a plurality of "parts" except "a module" or "a part" that needs to be implemented in specific hardware or is performed in at least one processor may be integrated into at least one module. Further, singular expressions include plural expressions, unless defined obviously differently in the context.

Also, in the description of the disclosure, the order of each step should be understood in a nonrestrictive way, unless a preceding step should necessarily be performed prior to a subsequent step in a logical and temporal sense. That is, excluding an exceptional case as above, even if a process described as a subsequent step is performed prior to a process described as a preceding step, there would be no influence on the essence of the disclosure, and the scope of the disclosure should also be defined regardless of the orders of steps. Further, the description "A or B" in this specification is defined to include not only a case wherein one of A or B is selectively referred to, but also a case wherein both of A and B are included. In addition, the term "include" in this specification includes a case wherein elements other than elements listed as being included are further included.

Further, in this specification, only essential elements necessary for describing the disclosure are described, and elements not related to the essence of the disclosure are not mentioned. Also, the descriptions of the disclosure should not be interpreted to have an exclusive meaning of including only the elements mentioned, but to have a non-exclusive meaning of also including other elements.

In addition, each embodiment of the disclosure may be independently implemented or operated, but it may also be implemented or operated in combination with another embodiment.

FIG. 1 is a diagram illustrating a process of measuring an LED panel according to one or more embodiments of the disclosure.

Referring to FIG. 1, an LED panel measuring system is illustrated. The LED panel measuring system includes an LED panel measuring apparatus 100 and a camera 200. An LED panel 10 may display a preset color. Also, each pixel of the LED panel 10 may be implemented as an LED element. As an example, an LED element may be an organic light emitting diode (OLED) or an inorganic light emitting diode. An inorganic light emitting diode having a size of 100 μm or smaller among inorganic light emitting diodes may be referred to as a micro LED.

The camera 200 captures an image of the LED panel 10 displayed in a preset color. The LED panel 10 may sequentially display red (R), green (G), or blue (B) colors. Then, the camera 200 also sequentially captures an image of the LED panel 10. For example, if the LED panel 10 displays the R color, the camera 200 captures an image of the LED panel 10 displaying the R color. Next, if the LED panel 10 displays the G color, the camera 200 captures an image of the LED panel 10 displaying the G color. Then, if the LED panel 10 displays the B color, the camera 200 captures an image of the LED panel 10 displaying the B color. The R color image, the G color image, and the B color image of the LED panel 10 captured at the camera 200 are provided to the LED panel measuring apparatus 100. Meanwhile, an image sensor of the camera 200 may not only be a CCD sensor but may also be a CMOS sensor.

The LED panel measuring apparatus 100 classifies each pixel from the provided image of the LED panel 10 into individual pixel regions according to a predetermined threshold brightness value 21. For example, if the luminance of a first pixel of the LED panel 10 is relatively high, a first pixel region including the first pixel may be relatively big. Meanwhile, if the luminance of a second pixel is relatively low, a second pixel region including the second pixel may be relatively small. That is, the size of a pixel region may be in a positive correlation with the brightness value of a pixel included in the pixel region. As an example, the LED panel measuring apparatus 100 may perform the classifying process of pixel regions for each of an image of the LED panel 10 displaying the R color, an image of the LED panel 10 displaying the G color, and an image of the LED panel 10 displaying the B color.

The LED panel measuring apparatus 100 obtains a tristimulus value of a classified pixel region by using a trained artificial intelligence model. For example, the artificial intelligence model may be implemented as a convolutional neural network (CNN), a deep neural network (DNN), a recurrent neural network (RNN), a restricted Boltzmann Machine (RBM), a deep belief network (DBN), a bidirectional recurrent deep neural network (BRDNN), or deep Q-networks, etc. Also, the artificial intelligence model may be an artificial intelligence neural network that learned the luminance and chromaticity of the pixels of the LED panel 10. A learning process of the luminance and chromaticity of pixels will be described in detail later.

As described above, a pixel region is a region including one pixel in each of an R color image, a G color image, and a B color image. Data of a pixel region of each of an R color image, a G color image, and a B color image corresponding to one pixel may be input into each channel of the trained artificial intelligence model. As described above, each pixel region may have a different size relative to one another according to the luminance of the pixel. The LED panel measuring apparatus 100 may input pixel regions having different sizes corresponding to the luminance of each pixel into the trained artificial intelligence model. In the LED panel measuring apparatus 100 of the disclosure, input data input into the artificial intelligence model may vary according to the size of a pixel region. That is, where the luminance of a pixel is low, a pixel region becomes small, and thus the size of the input data may also be small. Accordingly, the disclosure can reduce unnecessary operations, and can thus improve the processing speed.

Output of the trained artificial intelligence model may be 2D data of a tristimulus value. A tristimulus value means a combination wherein a desired color can be made by combining three primary colors (R, G, B) in an additive color model. Lights have an attribute of becoming brighter when they are overlapped, and thus an additive color model makes a light of a third color by mixing lights of different colors. In a human eye, cone cells receiving three kinds of lights of a short wavelength, a medium wavelength, and a long wavelength exist. Accordingly, a human eye determines colors based on three kinds of stimulus values through the cone cells. Accordingly, a tristimulus value means the value of each of the three primary colors (R, G, B) of light, and it may be expressed as X, Y, and Z values in a color space. Accordingly, the trained artificial intelligence model may output 2D data of X, 2D data of Y, and 2D data of Z which are the tristimulus value of the corresponding pixel to each channel based on the data of the pixel region of each of the input R color image, G color image, and B color image.

The LED panel measuring apparatus 100 obtains a tristimulus value of a pixel from the obtained 2D data of the tristimulus value. For example, the LED panel measuring apparatus 100 may convert from 2D data into 0D data. 0D data means data including a single value for each tristimulus value. That is, the LED panel measuring apparatus 100 may obtain a single tristimulus value from 2D data. As an example, a single tristimulus value may include a maximum value, a weighted average value, an average value, etc.

The LED panel measuring apparatus 100 obtains the luminance and chromaticity of each pixel based on the obtained tristimulus value 23. For example, in a color space, the luminance coordinate of a pixel may be expressed as x, y, and the chromaticity may be expressed as Y. The tristimulus value and the luminance coordinate of a pixel may be expressed as a functional relation as in Formula 1.

$$x = \frac{X}{X + Y + Z}$$
$$y = \frac{Y}{X + Y + Z}$$
$$z = \frac{Z}{X + Y + Z} = 1 - x - y$$

<div align="right">Formula 1</div>

Accordingly, the LED panel measuring apparatus 100 may obtain the luminance and chromaticity of each pixel based on the obtained tristimulus value. The LED panel measuring apparatus 100 may display the obtained luminance and chromaticity of each pixel through the display.

So far, a process that the LED panel measuring system uses to measure the LED panel 10 was briefly described. Hereinafter, the configuration of the LED panel measuring apparatus 100, a measuring process, and a process of training the artificial intelligence model will be described in detail.

Figure 2:
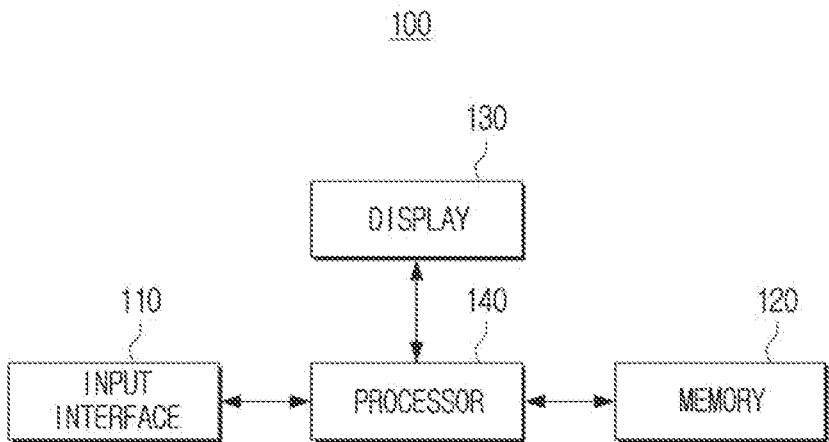
FIG. 2 is a block diagram illustrating a configuration of an LED panel measuring apparatus according to one or more embodiments of the disclosure.

FIG. 2 is a block diagram illustrating a configuration of an LED panel measuring apparatus according to one or more embodiments of the disclosure.

Referring to FIG. 2, the LED panel measuring apparatus 100 includes an input interface 110, a memory 120, a display 130, and a processor 140.

The input interface 110 receives input of an image that captured the LED panel displayed in a preset color. Also, the input interface 110 may receive input of a control instruction from a user. For example, the input interface 110 may be implemented as an input/output I/O port, a communication module, a keypad, a touch pad, a touch screen, etc. In case the input interface 110 is implemented as an input/output I/O port, an image that captured the LED panel may be input into the LED panel measuring apparatus 100 through a portable storage device. Alternatively, where the input interface 110 is implemented as a communication module, an image that captured the LED panel may be input into the LED panel measuring apparatus 100 through a wired/wireless communication method. The input interface 110 performs a function of receiving input of an image of the LED panel or an instruction from a user, and it may also be referred to as an inputter, an input module, etc.

The memory 120 may store data, etc. performing functions of the LED panel measuring apparatus 100, and store programs, instructions, etc. driven at the LED panel measuring apparatus 100. Also, the memory 120 may store the trained artificial intelligence model. The trained artificial intelligence model stored in the memory 120 may be loaded on the processor 140 by control by the processor 140, and perform a process of obtaining the luminance and chromaticity of a pixel. For example, the memory 120 may be implemented as a non-volatile memory, a volatile memory, a flash-memory, a hard disc drive (HDD), or a solid state drive (SSD), etc.

Meanwhile, the LED panel measuring apparatus 100 may further include a communication interface. The communication interface performs communication with an external apparatus. The communication interface may receive the trained artificial intelligence model or the obtained luminance/chromaticity from an external apparatus. Alternatively, the communication interface may transmit a measured tristimulus value to an external apparatus.

For example, the communication interface may include a module that can perform communication by methods such as LTE, 5G, Wi-Fi, Bluetooth, etc. The communication interface performing communication with an external apparatus may also be referred to as a communicator, a communication module, a transceiver, etc.

The LED panel measuring apparatus 100 may receive the trained artificial intelligence model or an output value of the artificial intelligence model from an external apparatus (e.g., an artificial intelligence server, a cloud, etc.) through the communication interface. For example, the trained artificial intelligence model may be stored in the external apparatus. The LED panel measuring apparatus 100 may receive the trained artificial intelligence model from the external apparatus, and store it in the memory 120. In this case, a plurality of LED panel measuring apparatuses may respectively receive the trained artificial intelligence model from the external apparatus, and store it in the memory. The plurality of LED panel measuring apparatuses may respectively perform an individual LED panel measuring operation by using the trained artificial intelligence model that it received from the external apparatus and stored. Alternatively, the LED panel measuring apparatus 100 may transmit an obtained tristimulus value to the external apparatus including the trained artificial intelligence model. The external apparatus may obtain the luminance and chromaticity based on the received tristimulus value and trained artificial intelligence model. The external apparatus may transmit the obtained luminance and chromaticity to the LED panel measuring apparatus 100.

The display 130 displays the obtained luminance and chromaticity of each pixel of the LED panel. For example, the display 130 may be implemented as a liquid crystal display (LCD), an organic light emitting diode (OLED), a flexible display, a touch screen, etc.

The processor 140 may control each component of the LED measuring apparatus 100. For example, the processor 140 controls the input interface 110 to receive input of an image that captured the LED panel displayed in a preset color, and controls the display 130 to display the obtained luminance and chromaticity of each pixel.

Also, the processor 140 classifies each pixel of the LED panel from the input image of the LED panel into pixel regions having different sizes according to a predetermined threshold brightness value. The sizes of the pixel regions may be in a positive correlation with the brightness values of the pixels included in the pixel regions. Then, the processor 140 loads the trained artificial intelligence model stored in the memory 120. The processor 140 obtains the tristimulus value of each pixel by using the data of the classified pixel regions and the trained artificial intelligence model. For example, the processor 140 may input the data of the pixel region in the R color, the data of the pixel region in the G color, and the data of the pixel region in the B color of each pixel of the LED panel into the trained artificial intelligence model. Then, the processor 140 may acquire 2D data for the tristimulus value of each pixel of a size corresponding to the size of the pixel region in the R color, the size of the pixel region in the G color, and the size of the pixel region in the B color from the trained artificial intelligence model. The processor 140 may convert the 2D data for the tristimulus value of each pixel into 0D data, and obtain a single tristimulus value. As an example, the single tristimulus value may include a maximum value, a weighted average value, an average value, etc. The processor 140 obtains the luminance and chromaticity of each pixel based on the obtained tristimulus value.

The LED panel measuring apparatus 100 may further include a camera. In this case, the LED panel measuring apparatus 100 may not receive input of an image of the LED panel captured by an external camera, but may capture an image of the LED panel by using the included camera (e.g., camera 200). The captured image of the LED panel may be transmitted to the processor 140, and the processor 140 may obtain the tristimulus value of each pixel through the aforementioned image processing process.

Figure 3:
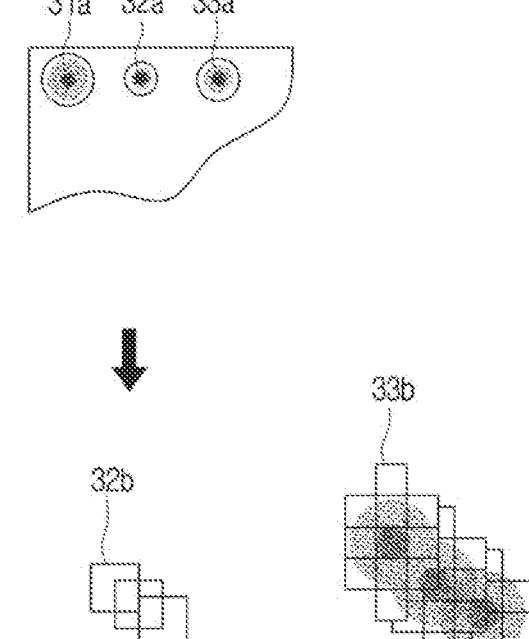
FIG. 3 is a diagram illustrating pixel regions according to one or more embodiments of the disclosure.

FIG. 3 is a diagram illustrating pixel regions according to one or more embodiments of the disclosure.

Referring to FIG. 3, an image that captured the LED panel is illustrated. In the LED panel, numerous respective LED elements are included, and one LED element may express one pixel. For the convenience of explanation, only three LED elements are explained as an example. The LED elements expressing the respective pixels may exhibit different characteristics in a processing process. Accordingly, even if LED elements display the same color, each LED element may emit light in different luminance, and thus the luminance of the three pixels may be different from one another.

As an example, as illustrated in FIG. 3, the first pixel (LED element) 31a may emit light in relatively the highest luminance, the second pixel 32a may emit light in relatively the lowest luminance, and the third pixel 33a may emit light in relatively middle luminance. Each pixel of an actual LED panel is arranged to be close such that it is hard to distinguish them with the naked eye. However, if an image that captured the LED panel displayed in a specific color is enlarged, each pixel may seem to be arranged at a specific interval as illustrated in FIG. 3. Also, each pixel region may seem to be a region of a different size from each other according to the luminance. Each pixel region may seem to be the brightest in the middle area wherein the LED element is located, and the brightness may become darker as it is farther from the middle area.

The LED panel measuring apparatus may classify pixel regions for each pixel based on a predetermined threshold brightness value. As the luminance of each pixel of the LED panel is different, the sizes of the classified pixel regions may be different from one another. As an example, it is assumed that the threshold brightness value was set as 150. As the first pixel 31a illustrated in FIG. 3 is expressed to be relatively the brightest, the region of which brightness value is greater than or equal to 150 may be about 5×5. Accordingly, the size of the first pixel region 31b including the first pixel 31a may be about 5×5. Meanwhile, as the second pixel 32a is expressed to be relatively the darkest, the region of which brightness value is greater than or equal to 150 may be about 1×1. Accordingly, the size of the second pixel region 32b including the second pixel 32a may be about 1×1. Also, as the third pixel 33a is expressed in relatively the middle brightness, the region of which brightness value is greater than or equal to 150 may be about 3×3. Accordingly, the size of the third pixel region 33b including the third pixel 33a may be about 3×3. Accordingly, the sizes of the pixel regions classified according to the threshold brightness value may vary according to the luminance of the pixels (the LED elements). Also, the sizes of the pixel regions 31b, 32b, 33b may be in a positive correlation with the brightness values of the pixels 31a, 32a, 33a included in the pixel regions.

The LED panel may sequentially display the R color, the G color, and the B color. The camera may capture an image of the R color, an image of the G color, and an image of the B color displayed on the LED panel. The LED panel measuring apparatus may classify the pixel regions of the respective pixels in different sizes from one another respectively based on the threshold brightness values from the input image of the R color, image of the G color, and image of the B color. The LED panel measuring apparatus may obtain 2D data of a tristimulus value for the classified pixel regions of the R, G, and B colors by using the trained artificial intelligence model. For example, the LED panel measuring apparatus may input data of the pixel region in the R color, data of the pixel region in the G color, and data of the pixel region in the B color of the first pixel into the artificial intelligence model, and obtain 2D data of the tristimulus value of the first pixel. The LED panel measuring apparatus may perform the aforementioned process identically to all pixels of the LED panel.

The advantage of the disclosure using pixel regions having different sizes will be described below.

FIG. 4A is a diagram illustrating sensing data according to one or more embodiments of the disclosure, FIG. 4B is a diagram illustrating fixed pixel data according to one or more embodiments of the disclosure, and FIG. 4C is a diagram illustrating dynamic pixel data according to one or more embodiments of the disclosure. Explanation will be described with reference to FIG. 4A to FIG. 4C.

Referring to FIG. 4A, sensing data for one pixel captured by the camera is illustrated. As illustrated in FIG. 4B, in a general method, an image processing process is performed for sensing data of a fixed pixel region, or the sensing data is used as input data of the artificial intelligence model. As described above, the luminance of a pixel may be expressed differently according to the LED element included in the pixel. Accordingly, in the general method, an image processing process is performed for a pixel having high luminance excluding necessary data. Alternatively, in the general method, an image processing process is performed for a pixel having low luminance while including unnecessary data. In this case, in the general method, there is a problem that an incorrect result value is obtained for a pixel having high luminance. On the other hand, in the general method, even unnecessary data should be processed, and thus there is a problem that unnecessary time is spent for an image processing process.

In contrast, as illustrated in FIG. 4C, in the method according to the disclosure, an image processing process is performed for sensing data wherein pixel regions are classified dynamically, and the sensing data is used as input data of the artificial intelligence model. Accordingly, in the method according to the disclosure, an image processing process is performed while including only all necessary data regardless of the luminance of pixels. Accordingly, in the method according to the disclosure, all necessary data is processed, and thus a correct result value can be obtained, and as only necessary data is processed, the time for the image processing process can be reduced.

Figure 5A:
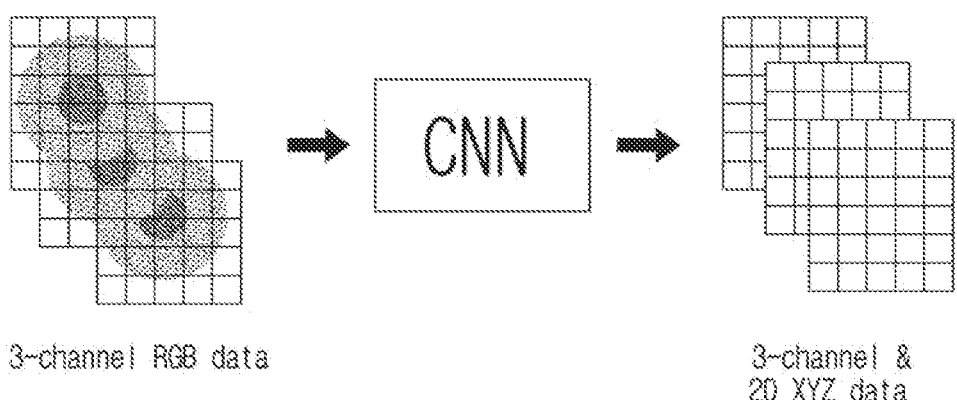
FIG. 5A is a diagram illustrating 2D data of a tristimulus value for a pixel region having relatively high luminance according to one or more embodiments of the disclosure.
Figure 5B:
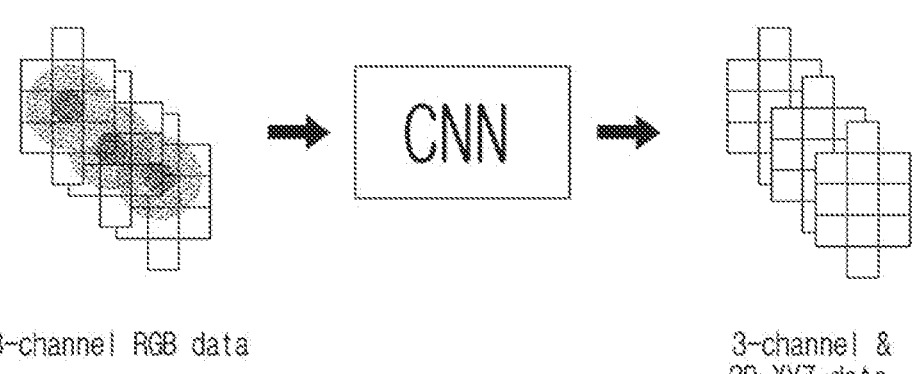
FIG. 5B is a diagram illustrating 2D data of a tristimulus value for a pixel region having relatively low luminance according to one or more embodiments of the disclosure.

FIG. 5A is a diagram illustrating 2D data of a tristimulus value for a pixel region having relatively high luminance according to one or more embodiments of the disclosure, and FIG. 5B is a diagram illustrating 2D data of a tristimulus value for a pixel region having relatively low luminance according to one or more embodiments of the disclosure. Explanation will be described with reference to FIG. 5A and FIG. 5B.

As described above, the LED panel measuring apparatus classifies pixel regions having different sizes for each pixel based on the threshold brightness value and the luminance information of the pixel. As an example, as illustrated in FIG. 5A, the size of the pixel region of the first pixel may be about 5×5. The LED panel measuring apparatus inputs the data of the pixel region of the first pixel having the size about 5×5 into the trained artificial intelligence model. For example, the artificial intelligence model may be implemented as a convolutional neural network (CNN), a deep neural network (DNN), a recurrent neural network (RNN), a restricted Boltzmann Machine (RBM), a deep belief network (DBN), a bidirectional recurrent deep neural network (BRDNN), or deep Q-networks, etc. The artificial intelligence model may receive input of data through three channels. The LED panel measuring apparatus may input the data of the pixel region in the R color, the data of the pixel region in the G color, and the data of the pixel region in the B color of the first pixel through each channel of the artificial intelligence model. That is, the artificial intelligence model may receive input of the RGB data of the three channels. The artificial intelligence model may be trained to output 2D data of the tristimulus value from the input RGB data.

As an example, in case the artificial intelligence model is a CNN, the CNN generally performs a convolution process, a rectified linear unit (ReLU) process, a pooling process, and a fully connected process. However, the CNN according to the disclosure may repeatedly perform the convolution process, the rectified linear unit (ReLU) process, and the pooling process for the input RGB data of the three channels, and may partially perform or may not perform the fully connected process.

The trained artificial intelligence model may output the 2D data of the tristimulus value of the three channels. That is, the trained artificial intelligence model may output the 2D data for X, the 2D data for Y, and the 2D data for Z of the three channels. Also, the trained artificial intelligence model may output the 2D data of the tristimulus value of the three channels in the size of about 5×5 correspondingly to the input size of the pixel region.

In the case of FIG. 5B, the trained artificial intelligence model may output 2D data of a tristimulus value through the same process as described in FIG. 5A. Meanwhile, the trained artificial intelligence model may output 2D data of a tristimulus value in a size corresponding to the size of the input data of a pixel region. As an example, the trained artificial intelligence model may receive input of RGB data of the pixel region of the second pixel in a size of about 3×3, and output 2D XYZ data for the second pixel in a size of about 3×3.

FIG. 6A is a diagram illustrating an embodiment of identifying a maximum value in 2D data of a tristimulus value as a tristimulus value of a pixel, and FIG. 6B is a diagram illustrating an embodiment of identifying an average value in 2D data of a tristimulus value as a tristimulus value of a pixel. Explanation will be described with reference to FIG. 6A and FIG. 6B.

Referring to FIG. 6A, 2D X data output from the trained artificial intelligence model is illustrated. The LED panel measuring apparatus may obtain the maximum value in the output 2D X data as the X value in the tristimulus value of the pixel. As an example, as illustrated in FIG. 6A, the maximum value in the output 2D X data is 189, and thus the LED panel measuring apparatus may obtain 189 as the X value of the pixel.

Meanwhile, the LED panel measuring apparatus may obtain the average value in the output 2D X data as the X value in the tristimulus value of the pixel. As an example, as illustrated in FIG. 6B, the average value of the output 2D X data is 123.9, and thus the LED panel measuring apparatus may obtain 123.9 as the X value of the pixel.

As the trained artificial intelligence model outputs 2D XYZ data, the LED panel measuring apparatus may also obtain the Y value and the Z value through the same process for 2D Y data and 2D Z data. The LED panel measuring apparatus may obtain the tristimulus value (X, Y, Z) of a pixel through the aforementioned process.

Meanwhile, as an example, the LED panel measuring apparatus may apply a weight to some areas of the 2D data, and obtain a signal average value based on the 2D data wherein a weight has been applied to some areas. The obtained single average value may be the tristimulus value of the pixel. In the 2D data wherein a weight has been applied to some areas, the obtained tristimulus value may be a weighted average value.

Figure 7:
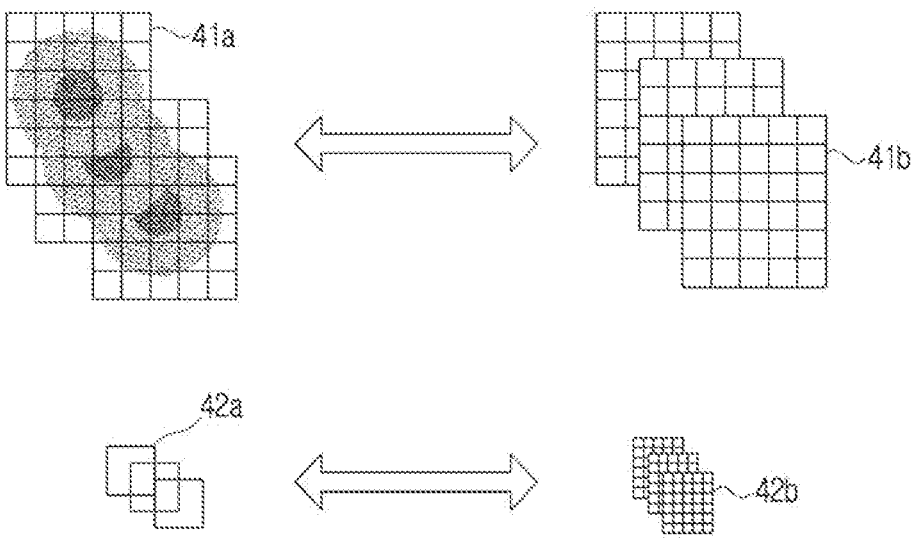
FIG. 7 is a diagram illustrating input data and output data training an artificial intelligence model according to one or more embodiments of the disclosure.

FIG. 7 is a diagram illustrating input data and output data training an artificial intelligence model according to one or more embodiments of the disclosure.

For the LED panel measuring apparatus to obtain a tristimulus value by using the artificial intelligence model, the artificial intelligence model needs to be trained first. The artificial intelligence model may be trained based on predetermined input data and output data.

As illustrated in FIG. 7, data of pixel regions 41a and 42a, of different sizes from each other, may be set as input data for training the artificial intelligence model. As an example, the RGB data of the first pixel region 41a and the RGB data of the second pixel region 42a of different sizes from each other may be set as input data. Also, the first 2D XYZ (the tristimulus value) data 41b and the second 2D XYZ data 42b of sizes corresponding to the input data may be set as output data.

Meanwhile, a tristimulus value of a pixel is one value. Accordingly, the output data for training the artificial intelligence model may be generated as 2D data to correspond to the shape and the size of the input data. For example, the output data may be generated as 2D data of the same size as the input data as the data is padded based on the tristimulus value. The artificial intelligence model may be trained based on the 2D XYZ output data set in a size corresponding to the RGB input data set in a specific size.

So far, an apparatus and a process for measuring an LED panel were described. Hereinafter, a method for measuring an LED panel will be described.

Figure 8:
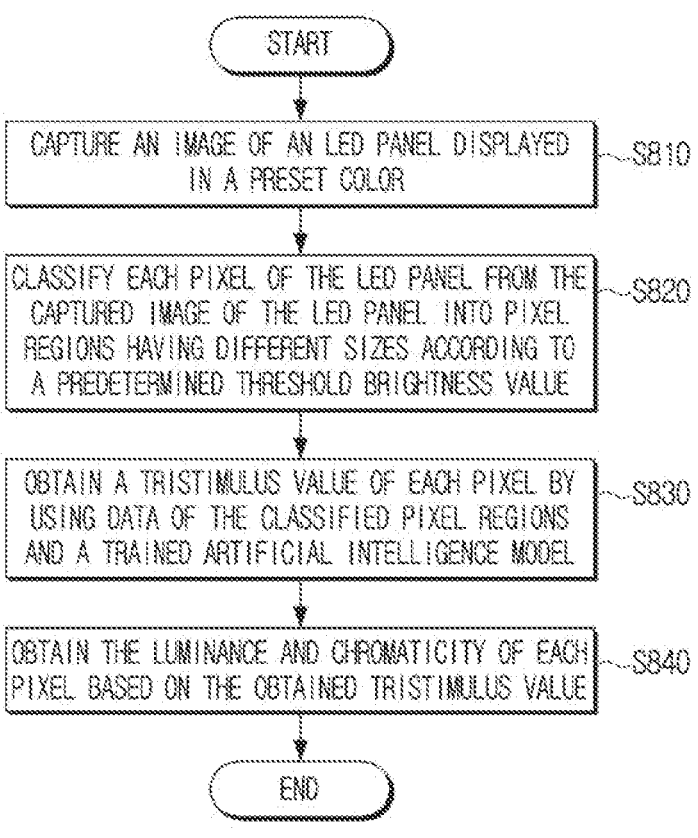
FIG. 8 is a flow chart illustrating a method for measuring an LED panel according to one or more embodiments of the disclosure.

FIG. 8 is a flow chart illustrating a method for measuring an LED panel according to one or more embodiments of the disclosure.

Referring to FIG. 8, the LED panel measuring system captures an image of the LED panel displayed in a preset color in operation S810. For example, the LED panel may sequentially display the R color, the G color, and the B color. The camera may capture the images of each color displayed on the LED panel. The captured image of the LED panel may be input into the LED panel measuring apparatus.

The LED panel measuring system may include the LED panel measuring apparatus and the camera as separate apparatuses. However, the LED panel measuring apparatus may also be implemented to include the camera. In this case, the measuring method of the LED panel measuring apparatus is identical to the measuring system of the LED panel measuring system.

The LED panel measuring system classifies each pixel of the LED panel from the captured image of the LED panel into pixel regions having different sizes according to a predetermined threshold brightness value in operation S820. The sizes of the pixel regions may be in a positive correlation with the brightness values of the pixels included in the pixel regions. That is, a pixel region including a pixel of high luminance may be bigger than a pixel region including a pixel of low luminance.

The LED panel measuring system obtains the tristimulus value of each pixel by using data of the classified pixel regions and a trained artificial intelligence model in operation S830. For training the artificial intelligence model, input data and output data may be set. The input data may be set as data of pixel regions in RGB colors of a preset size for one pixel. The output data may be set as 2D data of a tristimulus value of the same size as the input data. Meanwhile, the output data may be generated as 2D data of the same size as the input data as the data is padded based on the tristimulus value.

The LED panel measuring system may input the data of the pixel regions of the RGB colors of each pixel into the trained artificial intelligence model. Then, the LED panel measuring system may obtain the 2D data of the tristimulus value of a size corresponding to the size of the data of the pixel regions in the RGB colors from the trained artificial intelligence model. The LED panel measuring system may convert the data into 0D data based on the obtained 2D data of the tristimulus value, and obtain a single tristimulus value. As an example, the single tristimulus value may include a maximum value, a weighted average value, an average value, etc.

The LED panel measuring system obtains the luminance and chromaticity of each pixel based on the obtained tristimulus value in operation S840. As described above, the tristimulus value and the chromaticity are in a specific functional relation. Accordingly, the LED panel measuring system may obtain the chromaticity from the tristimulus value by using a function. Also, the Y value in the tristimulus value may be the luminance. Accordingly, the LED panel measuring system may obtain the luminance based on the Y value in the tristimulus value.

The LED panel measuring system may also include a display. The LED panel measuring apparatus may display the obtained chromaticity and luminance of the pixels through the display.

FIG. 9 is a diagram illustrating a measurement result according to one or more embodiments of the disclosure.

Referring to FIG. 9, it is apparent that the measuring method according to the disclosure enables faster measurement than the conventional method. Also, it is also apparent that the measuring method according to the disclosure has measurement accuracy of a level similar to the conventional method. In addition, in the measuring method according to the disclosure, an additional calibration step is unnecessary, and thus the measuring process can be simplified, and as a CMOS sensor can be used, there is an advantage that the cost can be reduced.

The measuring method of an LED panel according to the aforementioned various embodiments may also be provided as a computer program product. The computer program product may include an S/W program itself, or a non-transitory computer readable medium storing an S/W program.

A non-transitory computer readable medium refers to a medium that stores data semi-permanently, and is readable by machines, but not a medium that stores data for a short moment such as a register, a cache, and a memory. Specifically, the aforementioned various applications or programs may be provided while being stored in a non-transitory computer readable medium such as a CD, a DVD, a hard disc, a blue-ray disc, a USB, a memory card, a ROM and the like.

Also, while preferred embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Further, it is intended that such modifications are not to be interpreted independently from the technical idea or prospect of the disclosure.

What is claimed is:

1. A method for measuring an light-emitting diode (LED) panel, the method comprising:
    capturing an image of the LED panel while the LED panel displays a preset color;
    classifying, based on the captured image of the LED panel, each pixel of the LED panel into pixel regions comprising different sizes, wherein the size of each pixel region corresponds to a predetermined threshold brightness value;
    obtaining a tristimulus value of each pixel of the LED panel based on the classified pixel regions and a trained artificial intelligence model; and
    obtaining a luminance and a chromaticity of each pixel of the LED panel based on the obtained tristimulus value.

2. The method of claim 1,
    wherein a positive correlation exists between the sizes of the pixel regions and brightness values of the pixels included in the pixel regions.

3. The method of claim 1,
    wherein the trained artificial intelligence model is trained using input data for one pixel comprising data of a pixel region in a red (R) color of a preset size, data of a pixel region in a green (G) color of the preset size, and data of a pixel region in a blue (B) color of the preset size, and output data for the one pixel comprising two-dimensional (2D) data of a tristimulus value of the same size as the preset size.

4. The method of claim 3, wherein the output data is padded based on the tristimulus value.

5. The method of claim 1, wherein the obtaining the tristimulus value of each pixel further comprises:

inputting data of a pixel region in a red (R) color, data of a pixel region in a green (G) color, and data of a pixel region in a blue (B) color of each pixel of the LED panel into the trained artificial intelligence model, and obtaining two-dimensional (2D) data for a tristimulus value of each pixel of a size corresponding to a size of the pixel region of the R color, a size of the pixel region of the G color, and a size of the pixel region of the B color from the trained artificial intelligence model.

6. The method for measuring an LED panel of claim 5, wherein the obtaining the tristimulus value of each pixel further comprises:

obtaining a single value as the tristimulus value of each pixel comprising one of a maximum value, an average value, or a weighted average value of the 2D data for the tristimulus value of each pixel.

7. A light-emitting diode (LED) panel measuring apparatus comprising:

an input interface;

a display;

at least one memory storing a trained artificial intelligence model; and at least one processor configured to:

control the input interface to receive an image of an LED panel displaying a preset color, classify, based on the received image of the LED panel, each pixel of the LED panel into pixel regions comprising different sizes, wherein the size of each pixel region corresponds to a predetermined threshold brightness value, obtain a tristimulus value of each pixel of the LED panel based on the data of the classified pixel regions and the trained artificial intelligence model, and obtain a luminance and a chromaticity of each pixel of the LED panel based on the obtained tristimulus value, and display the obtained luminance and the obtained chromaticity of each pixel on the display.

8. The LED panel measuring apparatus of claim 7, wherein a positive correlation exists between the sizes of the pixel regions and brightness values of the pixels included in the pixel regions.

9. The LED panel measuring apparatus of claim 7, wherein the trained artificial intelligence model is trained using data for one pixel comprising data of a pixel region in a red (R) color of a preset size, data of a pixel region in a green (G) color of the preset size, and data of a pixel region in a blue (B) color of the preset size for one pixel are set as input data, and output data for the one pixel comprising two-dimensional (2D) data of a tristimulus value of the same size as the preset size.

10. The LED panel measuring apparatus of claim 9, wherein the output data is padded based on the tristimulus value.

11. The LED panel measuring apparatus of claim 7, wherein the at least one processor is further configured to:

input data of a pixel region in a red (R) color, data of a pixel region in a green (G) color, and data of a pixel region in a blue (B) color of each pixel of the LED panel into the trained artificial intelligence model, and obtain two-dimensional (2D) data for a tristimulus value of each pixel of the LED panel of a size corresponding to a size of the pixel region of the R color, a size of the pixel region of the G color, and a size of the pixel region of the B color from the trained artificial intelligence model.

12. The LED panel measuring apparatus of claim 11, wherein the at least one processor is further configured to:

obtain a single value as the tristimulus value of each pixel of the LED panel comprising one of a maximum value, an average value, or a weighted average value of the 2D data for the tristimulus value of each pixel of the LED panel.

13. A light-emitting diode (LED) panel measuring system comprising:

a camera configured to capture an image of an LED panel while the LED panel displays a preset color; and an LED panel measuring apparatus comprising: at least one memory storing at least one instruction; and at least one processor configured to execute the at least one instruction to:

receive input of the captured image of the LED panel, classify, based on the captured image of the LED panel, each pixel of the LED panel into pixel regions having different sizes, wherein the size of each pixel region corresponds to a predetermined threshold brightness value, obtain a tristimulus value of each pixel of the LED panel based on the data of the classified pixel regions and a trained artificial intelligence model, obtain a luminance and a chromaticity of each pixel of the LED panel based on the obtained tristimulus value, and display, on a display, the obtained luminance and the obtained chromaticity of each pixel.

14. The LED panel measuring system of claim 13, wherein a positive correlation exists between the sizes of the pixel regions and the brightness values of the pixels included in the pixel regions.

15. The LED panel measuring system of claim 13, wherein the trained artificial intelligence model is trained using input data for one pixel comprising data of a pixel region in a red (R) color of a preset size, data of a pixel region in a green (G) color of the preset size, and data of a pixel region in a blue (B) color of the preset size, and output date for the one pixel comprising two-dimensional (2D) data of a tristimulus value of the same size as the preset size.

16. The LED panel measuring system of claim 15, wherein the output data is padded based on the tristimulus value.

17. The LED panel measuring system of claim 13, wherein the at least one processor is further configured to:

input data of a pixel region in a red (R) color, data of a pixel region in a green (G) color, and data of a pixel region in a blue (B) color of each pixel of the LED panel into the trained artificial intelligence model, and obtain two-dimensional (2D) data for a tristimulus value of each pixel of the LED panel of a size corresponding to a size of the pixel region of the R color, a size of the pixel region of the G color, and a size of the pixel region of the B color from the trained artificial intelligence model.

18. The LED panel measuring system of claim 17, wherein the at least one processor is further configured to:

obtain a single value as the tristimulus value of each pixel of the LED panel comprising one of a maximum value, an average value, or a weighted average value of the 2D data for the tristimulus value of each pixel of the LED panel.

19. A non-transitory computer readable medium having instructions stored therein, which when executed by a processor cause the processor to execute a method of measuring a light-emitting diode (LED) panel, the method comprising:

capturing an image of the LED panel while the LED panel displays a preset color;

classifying, based on the captured image of the LED panel, each pixel of the LED panel into pixel regions comprising different sizes, wherein the size of each pixel region corresponds to a predetermined threshold brightness value;

obtaining a tristimulus value of each pixel based on the classified pixel regions and a trained artificial intelligence model; and obtaining a luminance and a chromaticity of each pixel of the LED panel based on the obtained tristimulus value.

\*　\*　\*　\*　\*